United States Patent [19]
Skirpan

[11] Patent Number: 5,202,538
[45] Date of Patent: Apr. 13, 1993

[54] PORTABLE POWER DISTRIBUTION CABINET

[75] Inventor: Stephen J. Skirpan, Port Washington, N.Y.

[73] Assignee: Union Connector Co., Inc., Roosevelt, N.Y.

[21] Appl. No.: 747,853

[22] Filed: Aug. 20, 1991

Related U.S. Application Data

[63] Continuation-in-part of Ser. No. 496,412, Mar. 20, 1990, Pat. No. 5,070,429.

[51] Int. Cl.$^5$ .............................................. H02G 3/22
[52] U.S. Cl. ..................... 174/65 R; 248/56; 361/428
[58] Field of Search ............... 174/65 R, 15; 248/56; 361/340, 428; 439/449, 470

[56] References Cited

U.S. PATENT DOCUMENTS

| | | | |
|---|---|---|---|
| 2,167,525 | 7/1939 | Rosendale | 220/668 |
| 2,175,025 | 10/1939 | Hooven | 174/59 |
| 2,538,070 | 1/1951 | Wright et al. | 361/331 |
| 2,756,369 | 7/1956 | Gorrie | 361/428 |
| 2,757,059 | 7/1956 | Forrest | 312/213 |
| 2,790,113 | 4/1957 | Brown | 361/363 |
| 2,823,339 | 2/1958 | Locher | 361/363 |
| 2,871,457 | 1/1959 | Jencks et al. | 439/370 |
| 2,975,227 | 3/1961 | Wiater et al. | 174/52.1 |
| 2,999,190 | 9/1961 | Armandroff et al. | 174/59 X |
| 3,012,835 | 12/1961 | Anderson | 312/265.5 |
| 3,715,627 | 2/1973 | D'Ausilio | 361/357 |
| 3,786,312 | 1/1974 | Roussard | 361/356 |
| 3,851,226 | 11/1974 | Chen | 361/358 |
| 4,018,982 | 4/1977 | Svekis | 174/65 R |
| 4,426,674 | 1/1984 | Holte | 361/429 X |
| 4,473,166 | 9/1984 | Breiter | 220/693 |
| 4,742,477 | 5/1988 | Phillips et al. | 361/380 X |
| 4,869,380 | 9/1989 | Metcalfe et al. | 361/429 X |

Primary Examiner—Leo P. Picard
Assistant Examiner—David Tone
Attorney, Agent, or Firm—Kenyon & Kenyon

[57] ABSTRACT

A modular, light-weight, portable electric power distribution cabinet having high structural integrity and being readily adaptable for cost effective use in a wide variety of applications. The cabinet can be arranged to be a main power feed, trunk or branch feed type cabinet and a plurality of cabinets of said type can be selectively coupled to one another to provide a power distribution network of any desired configuration. The cabinet also provides for direct access of power cables to the interior of the cabinet so that cables with lugs at the ends thereof can be directly coupled to a bus feed arrangement within the cabinet. The direct access feature of the cabinet includes a cable clamp door to simultaneously engage and clamp a plurality of lugged cables for ancillary strain relief. The cabinet includes a transparent panel to permit a worker to view the interior of the cabinet without exposure to an electric shock hazard so that the worker can attend to the coupling of the lugged cables to the bus feed arrangement. The transparent panel is provided with small diameter holes for direct insertion of an appropriate tool to engage set screws of the lugs of the lugged cables so that the lugged cables can be fastened to the bus feed arrangement without having to remove any panels from the cabinet.

12 Claims, 15 Drawing Sheets

FIG.7
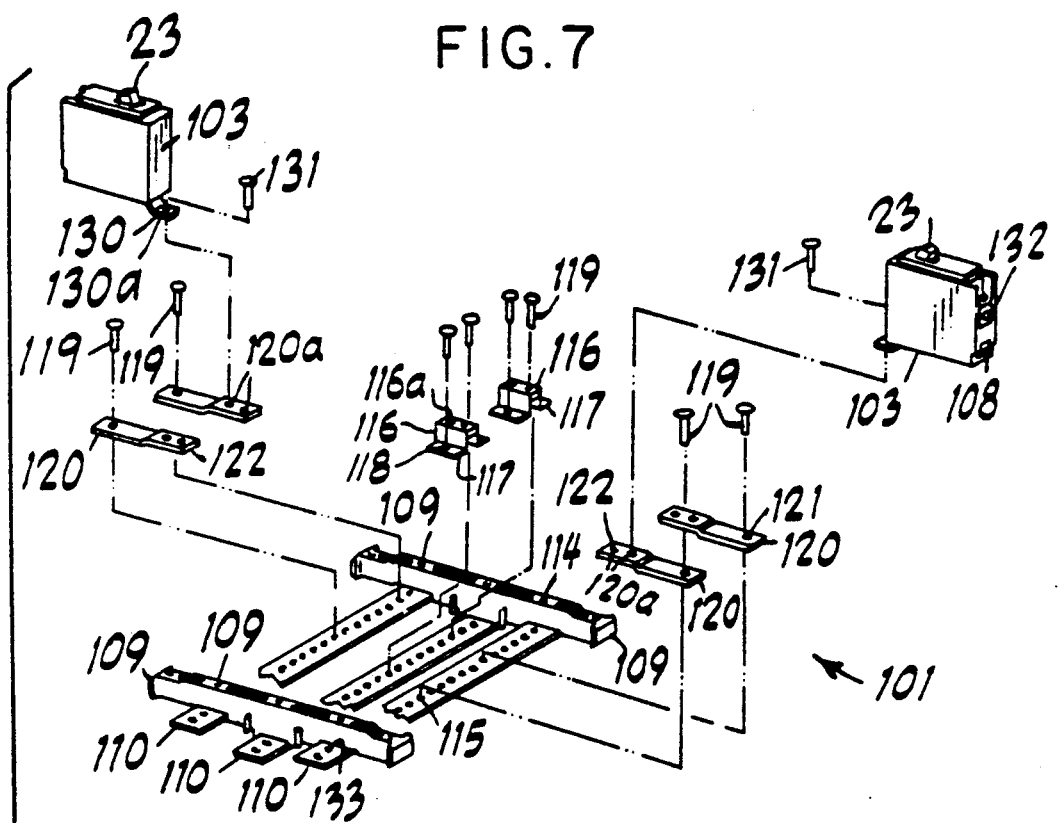
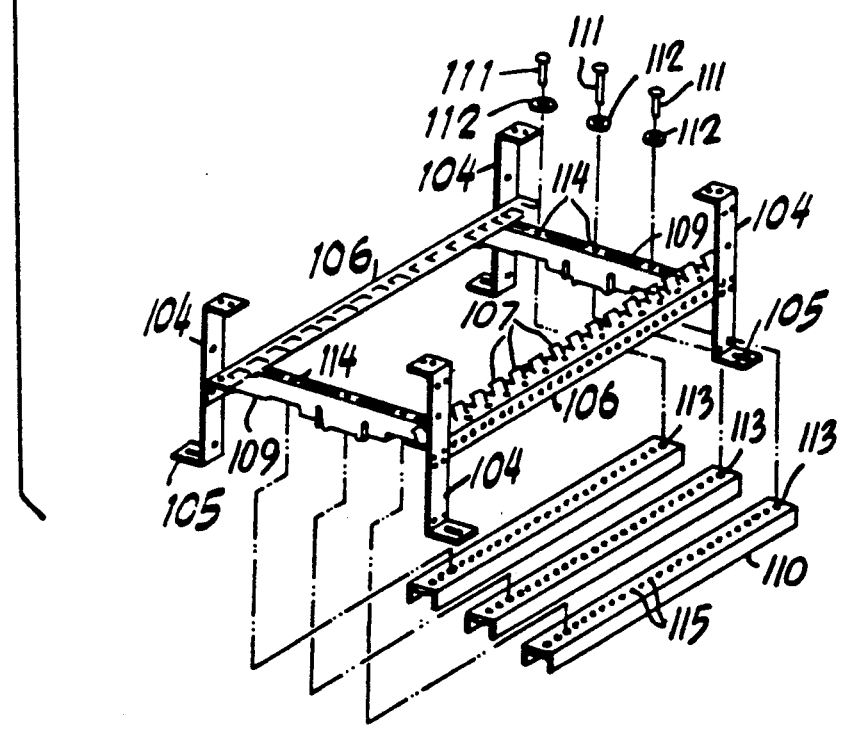

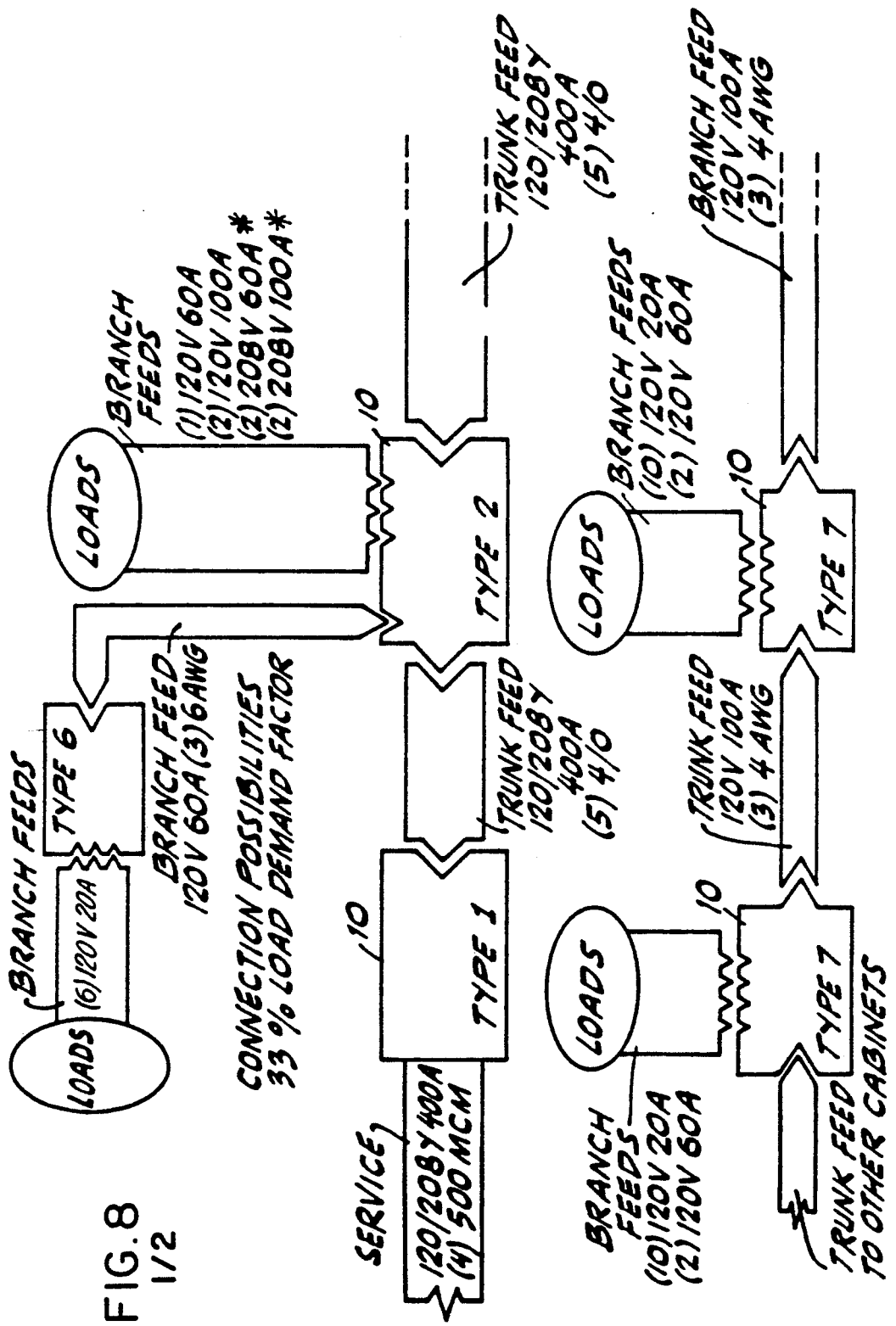
FIG. 8 1/2

2/2

PORTABLE POWER DISTRIBUTION CABINET

RELATED APPLICATION

This application is a continuation-in-part of application Ser. No. 496,412, filed Mar. 20, 1990, entitled PORTABLE POWER DISTRIBUTION CABINET AND POWER DISTRIBUTION NETWORK, now U.S. Pat. No. 5,070,429.

FIELD OF THE INVENTION

The present invention is directed to a high capacity, portable electric power distribution cabinet. More particularly, the present invention provides a new and improved modular, light-weight, portable electric power distribution cabinet having high structural integrity and being readily adaptable for cost effective use in a wide variety of applications.

BACKGROUND OF THE INVENTION

There are many facilities, buildings, sites and locations that require electric power and yet do not have fixed electric power distribution systems. For example, in the entertainment industry, motion picture and television production studios typically comprise a building shell to provide an interior that is isolated from ambient light and sound. The building shell does not contain any fixed internal structures or utilities to afford maximum versatility in the use of the interior of the building shell for the construction of sets. As should be understood, sets for motion picture productions vary widely from film project to film project and the electrical requirements for any particular set are not known until the project is scheduled for production and the set is designed. Any fixed internal electrical wiring or power distribution equipment would limit the placement of lighting fixtures, technical equipment and other devices, such as special effects machines, and, thus, restrict the use of the studio. Accordingly, portable power distribution arrangements are installed to service the power needs of a particular set and are then removed when the set is struck.

There are also many other sites and locations having power distribution needs that vary with time, such as an outdoor site used for traveling carnivals, outdoor concerts, theme parks and so on. Indeed, there are a great many locations that require a portable power distribution facility that can be easily installed on a temporary basis, configured and reconfigured to any desired network of main power feed, trunk feeds and branch circuits and conveniently disassembled for storage and/or shipment to other locations. Examples of such locations, in addition to those discussed above, include construction sites, convention and exhibit halls and any area or location during times of emergency such as earthquakes and the like.

However, presently known components used to provide portable power distribution are heavy and massive in size and construction, are not standardized, and are generally difficult and labor-intensive to install. They are also not suitable for convenient handling, storage or transportation to various sites. For example, the motion picture industry typically utilizes heavy panel boards, each containing a main connection to a power source. Each panel board includes power outputs having large machine-screw studs to which lugged cables are attached. Over current protection is generally not provided for any of the branch circuits fed by the lugged cables. Moreover, the panel boards are so large and heavy that they require machines to lift and load them into a truck for transportation.

The motion picture industry also commonly utilizes a wiring device referred to as a "Sister" lug. A sister lug generally comprises a cast brass lug with a U shaped opening and a set screw. The sister lug is typically soldered to a flexible cable for transmission of electrical power to or from the lug. In practice, the U shaped opening of the sister lug is received around a cooper conductor bus of a power cabinet input or output terminal and held in contact with the bus by the set screw. In this manner, electrical power can be transmitted to and from a power cabinet via an arrangement of cables and sister lugs.

While sister lugs provide a fast, rugged and inexpensive form of electrical connector, they pose electrical code compliance problems. For example, the set screw of the sister lug arrangement is used to secure the lug to the bus and to provide a good electrical contact between the lug and the conductor bus. Accordingly, as required by, for example, the National Electric Code (NEC), an ancillary strain relief device must be provided to relieve any mechanical force applied to the cable soldered to the lug.

Without an ancillary strain relief, mechanical forces would be applied directly to the set screw which could cause the electrical connection to loosen. Indeed, if the mechanical force is great enough, the sister lug may become free from the connector bus. In addition, an electrical overload on the cables or electrical arcing caused by a loose connection can heat the solder connection between the cable and the lug. In some circumstances, the heat generated can be sufficient enough to melt the solder connection and free the cable. The use of an ancillary strain relief device makes certain that the cable is secured in a fixed position in the event the sister lug loosens or the cable becomes disconnected from the lug due to, e.g., solder melting.

However, the use of an ancillary strain relief device adds to the amount of labor needed to attach a sister lug to a conductor bus. When many lugged cables must be connected in a power distribution network, the total extra labor required for securing ancillary stress relief devices individually to each cable in the network can become a considerable disadvantage in the use of sister lugs. Furthermore, the use of conventional electrical cable clamps for ancillary strain relief is ordinarily not feasible inasmuch as the typical size of a sister lug exceeds the diameter of a conventional cable clamp.

In another known portable power device, generally referred to as a load splitter box, several bus bars are mounted on insulators. Each bus bar is coupled to a lug-connector input of a heavy feeder cable. C-clamp type lugs are used to connect branch circuit cables to the bus bars and no over-current branch protection is provided for the individual branch circuit cables. Carnivals often use such load splitter boxes and simply cover exposed electrical connections with a rubber mat. Such load splitter boxes are labor-intensive to install and do not accommodate a wide variety of electric power applications.

In addition, the lack of over-current protection for each individual branch circuit coupled to the panel board or load splitter box, is highly undesirable. For example, a branch overload or short circuit can result in dangerous cable overloading and resultant fires. There are also inherent hazardous conditions present in a wire or cable size reduction, as for example, from the bus bar to branch circuit cable of the load splitter box. Such potential hazardous conditions remain unchecked without overcurrent protection for each individual branch circuit.

Moreover, in many instances, various power distribution units must be coupled to one another to provide a power distribution network. The lack of standardization between known power distribution devices and the varying approaches to portable power distribution adapted on an "as-needed" basis by those who require portable power distribution, has left the industry without a cost-effective, convenient and versatile component suitable to provide a wide variety of network configurations supplying widely varying electrical needs.

SUMMARY OF THE INVENTION

The present invention provides a light-weight, versatile and portable power distribution cabinet having a modular design of high structural integrity suitable for expedient change of power connectors, power connector panels and circuit breakers. In this manner, a single power distribution cabinet can be readily adapted to a wide range of applications and selectively coupled to other such cabinets for use as a main power feed, trunk feed and/or branch circuit feed within a power distribution network.

Generally, the cabinet structure according to the present invention comprises end frames, each suitable for manufacture as a single cast piece for structural integrity, and arranged to removably mount an end panel recessed from the plane defined by the end edges of the end frame. Corner rails extend between the interior corners of the end frames to provide the side corners of the cabinet. Each corner rail also provides cabinet corner forming surfaces and panel receiving surfaces offset from the corner forming surfaces for removable mounting of side, top and bottom cabinet panels that are recessed from corners of the cabinet defined by the corner rails.

Each end and side panel can be arranged to mount a predetermined number of electrical connectors, each being of a preselected configuration, type and power capacity. The removable mounting of each panel to the end frames or panel receiving surfaces of the corner rails, as the case may be, provides a high degree of flexibility and versatility to the design of the cabinet according to the present invention. A panel or panels having electrical connectors of a type, power capacity, etc. required by an application intended for the power distribution cabinet at the particular time, can be conveniently mounted to the cabinet.

Those panels can then be removed and replaced with other panels when another application, having different connector requirements, is intended. Thus, a single cabinet can be readily equipped with any type of connector simply by maintaining an inventory of panel members mounting various different types of connectors and mounting suitable panels to the cabinet, as required. In addition, the flat metal piece structure of the panels makes it very cost-effective to maintain such an inventory of panels for connector changes.

Moreover, the recessed mounting of each end, side, top and bottom panel, as described above, affords easy handling and stacking of the cabinets, since the connectors mounted on the panels will also be recessed and therefor not exposed to contact with connectors of another cabinet in a stack or a floor surface. The end frames, panels and corner rails are suitable for manufacture from aluminum for a light weight, yet durable and rust resistant construction.

One of the panels of the cabinet, typically the bottom panel, is utilized to mount a circuit breaker chassis within the interior of the cabinet to, in turn, removably mount one or more circuit breakers, typically one circuit breaker for each branch circuit connector mounted on the other panels of the cabinet for individual branch circuit overcurrent protection. Another panel of the cabinet, e.g., one of the end panels assembled to an end frame, can be arranged to mount high-capacity, main power plug-in type connectors. For example, in a three phase system, there would be one plug-in connector for each phase, a fourth plug-in connector for a neutral terminal of the three phase system and a fifth plug-in connector acting as a ground.

A novel bus bar feed arrangement is also mounted within the interior of the cabinet to couple each main power plug-in terminal to intermediate connectors that provide removable couplings to the chassis mounted circuit breakers, panel mounted connectors and a ground connector. The intermediate connectors permit the intercoupling of the main power plug-in connectors to other panel mounted connectors to construct main power, trunk and branch circuit feeds, as desired, while facilitating the easy removal and replacement of the panels, as well as the circuit breakers, for a new electric power application.

One of the panels can be arranged to provide direct access to the bus bar feed arrangement mounted within the interior of the cabinet so that cables having lugs, such as, for example, sister lugs, can be directly coupled to the conductor busses of the bus bar arrangement. The direct access panel includes openings for insertion of the lug ends of power cables into the interior of the cabinet.

An additional top opening is also provided in the cabinet so that a worker has access to the interior of the cabinet for attaching the sister lugs of the cables to the appropriate busses via the set screws without having to remove any of the panels of the cabinet. The opening is protected by a heavy duty, heat resistant, transparent window, such as, e.g., a transparent plastic panel. In this manner, the worker can view the lugged cables and conductor busses while the interior of the cabinet is isolated from the worker by the plastic window. Accordingly, the transparent panel will prevent electric shock hazard when the cables are energized. The transparent panel is provided with relatively small diameter holes aligned with the set screws of the lugged cables so that the worker can insert an appropriate tool to secure the set screws. The diameter of the holes and the spacing of the transparent panel from the lugged cables are dimensioned to maintain the shock prevention function of the transparent panel.

Moreover, the direct access panel includes a hinged cable clamp door that is arranged to close over the openings for the cables with sufficient clearance between the lower end of the cable clamp door and the bottom of each one of the openings for placement of the cables. However, the clearance is dimensioned so that the lower end of the cable clamp door engages and clamps the cables between the lower end of the door and the bottom of each of the respective openings to provide an ancillary strain relief for all of the cables. Thus, the cable clamp door arrangement can be utilized to simultaneously clamp all of five cables of, for example, a three phase system, for ancillary strain relief of the cables in an efficient and expeditious manner.

Thus, each individual cabinet can be adapted to be either a main power feed, including a main circuit breaker, a trunk feed and/or a feed to a plurality of branch circuits, each branch circuit including its own circuit breaker for maximum overcurrent protection throughout the network. The main, trunk and branch arrangements for the individual cabinets provide three basic cabinet types that can be utilized to construct a power-distribution network of any configuration.

The portable power distribution cabinet according to the present invention is highly modular from the end frame, corner rail cabinet construction, removable connector and direct access panels and circuit breaker chassis to the flexible intercoupling of prearranged main feed, trunk feed and branch circuit power distribution cabinets, to form a network of any preselected configuration and operating characteristics.

BRIEF DESCRIPTION OF THE DRAWINGS

FIG. 7 is an exploded perspective view of a circuit breaker chassis mounted to a bottom panel of the cabinet according to the present invention.

DETAILED DESCRIPTION

Figure 1:
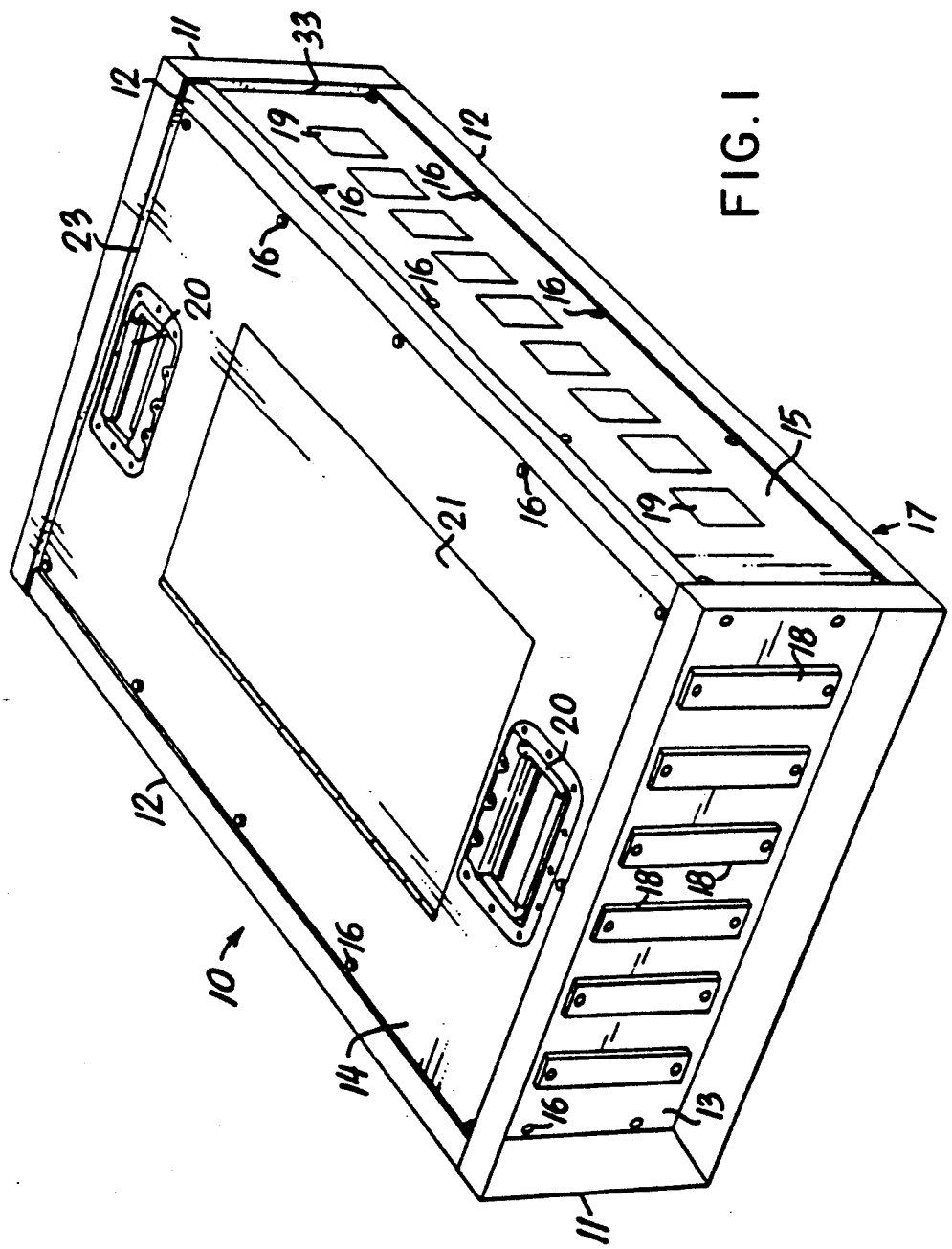
FIG. 1 is a perspective view of an assembled portable power distribution cabinet according to the present invention.

Referring now to the drawings and initially to FIG. 1, there is illustrated a perspective view of a portable power distribution cabinet according to the present invention, designated generally by the reference numeral 10. The cabinet comprises a pair of end frames 11 assembled to one another by four corner rails 12. Enclosure panels such as end 13, top 14, side 15 and bottom 17 panels are mounted to the end frame 11 and corner rails 12, respectively and are secured thereto by threaded screws 16 for easy removal, when desired. Each of the end frames 11 and corner rails 12 is arranged and configured to provide panel receiving surfaces such that each panel 13, 14, 15, 17 is recessed from the outermost corner and end surfaces of the cabinet 10, as clearly illustrated in FIG. 1 and as will be described in more detail below.

A first series of electrical connectors 18 is mounted to the end panel 13 and a second series of electrical connectors 19 is mounted to the side panel 15. Each connector 18, 19 can comprise any preselected type of known electrical connector, e.g., screw type, male-female plug type or even standard household outlets, of varying power capacities, as desired by a user. For example, the connectors 18 can comprise high capacity female plugs for coupling, via plug-in, flexible power cables (not specifically illustrated), to a source of power such as a generator or to another power distribution cabinet, to provide a trunk feed within a network. The connectors 19 can be lower capacity, 120 V, 60 A plugs for direct connection to various branch loads, such as lighting fixtures. Any of the panels 13, 14, 15, 17 and the connectors 18, 19 mounted thereon can be readily removed from the cabinet 10, by unscrewing the respective screws 16, and replaced by other panels mounting any other type of connectors, as may be required in another electric power application of the cabinet 10.

Thus, the mounting of the connectors 18, 19 on panels that can be readily removed from the cabinet 10, provides a modular construction facilitating a highly versatile utility for the cabinet 10. Any connector type needed by a particular power application can be easily mounted on the cabinet by simple replacement of, e.g., the end 13 and side 15 panels with end 13 and side 15 panels having the required connector type. Moreover, panels 13, 14, 15, 17 are recessed by a dimension such that the connectors 18, 19 are also recessed from the outermost edges of the cabinet 10 to permit stacking of the cabinets 10, particularly while not in use, for storage or shipment, without any physical contact between connectors 18, 19 mounted on panels of adjacent, stacked cabinets 10.

As illustrated in FIG. 1, the top panel 14 can be provided with rotatable, recessed handles 20, for convenient lifting of the cabinet 10 and a hinged panel door 21, for easy access to, e.g., individual circuit breakers switches 23 (See FIG. 2) mounted within the cabinet, as will be described. The top panel 14 can include a switch housing 22 integral therewith and extending into the interior of the cabinet 10 to expose the switches 23 through openings 24 formed in the housing 22, for convenient manual manipulation, while isolating the remaining interior of the cabinet 10, to prevent exposure to electrical connections.

Figure 2:
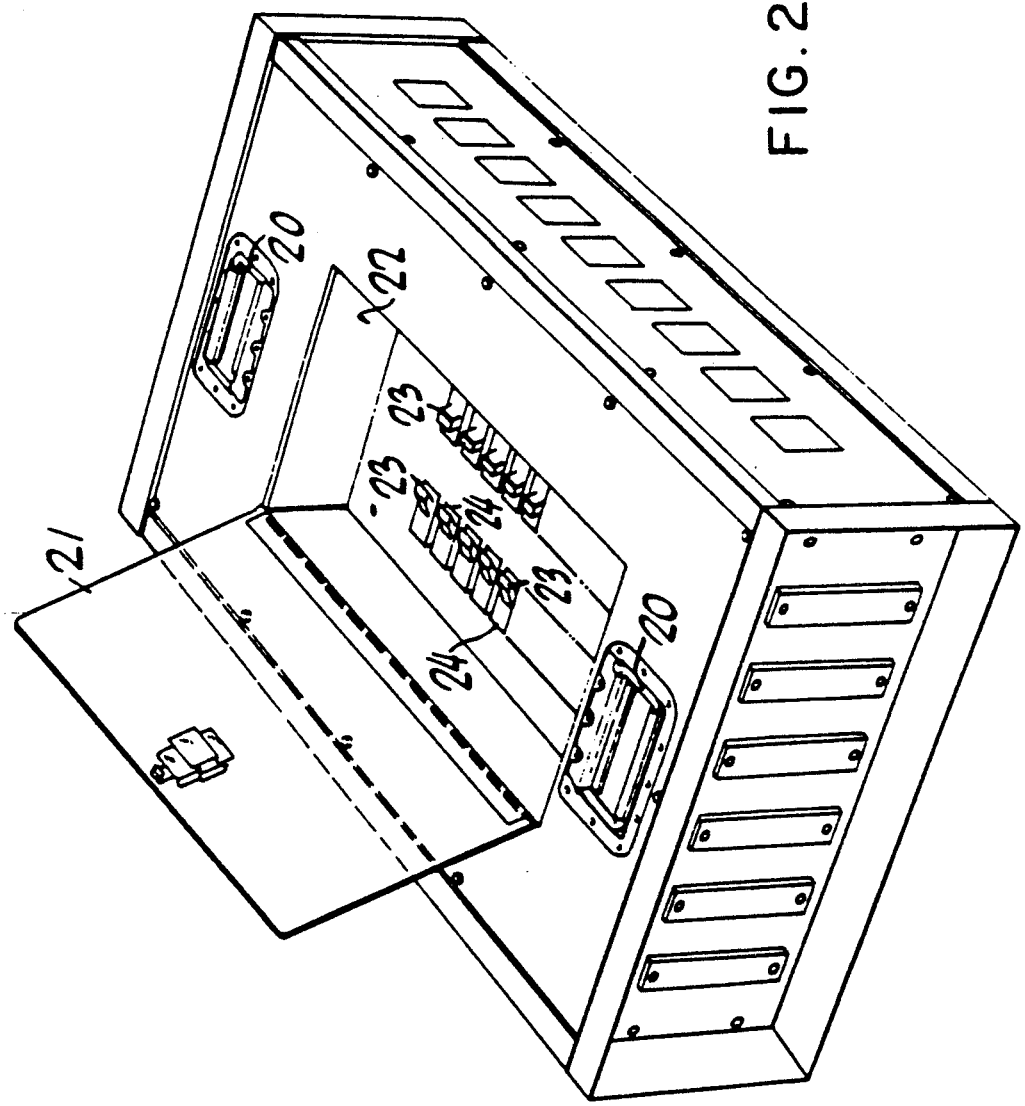
FIG. 2 is another perspective view of the portable power distribution cabinet of FIG. 1.
Figure 3:
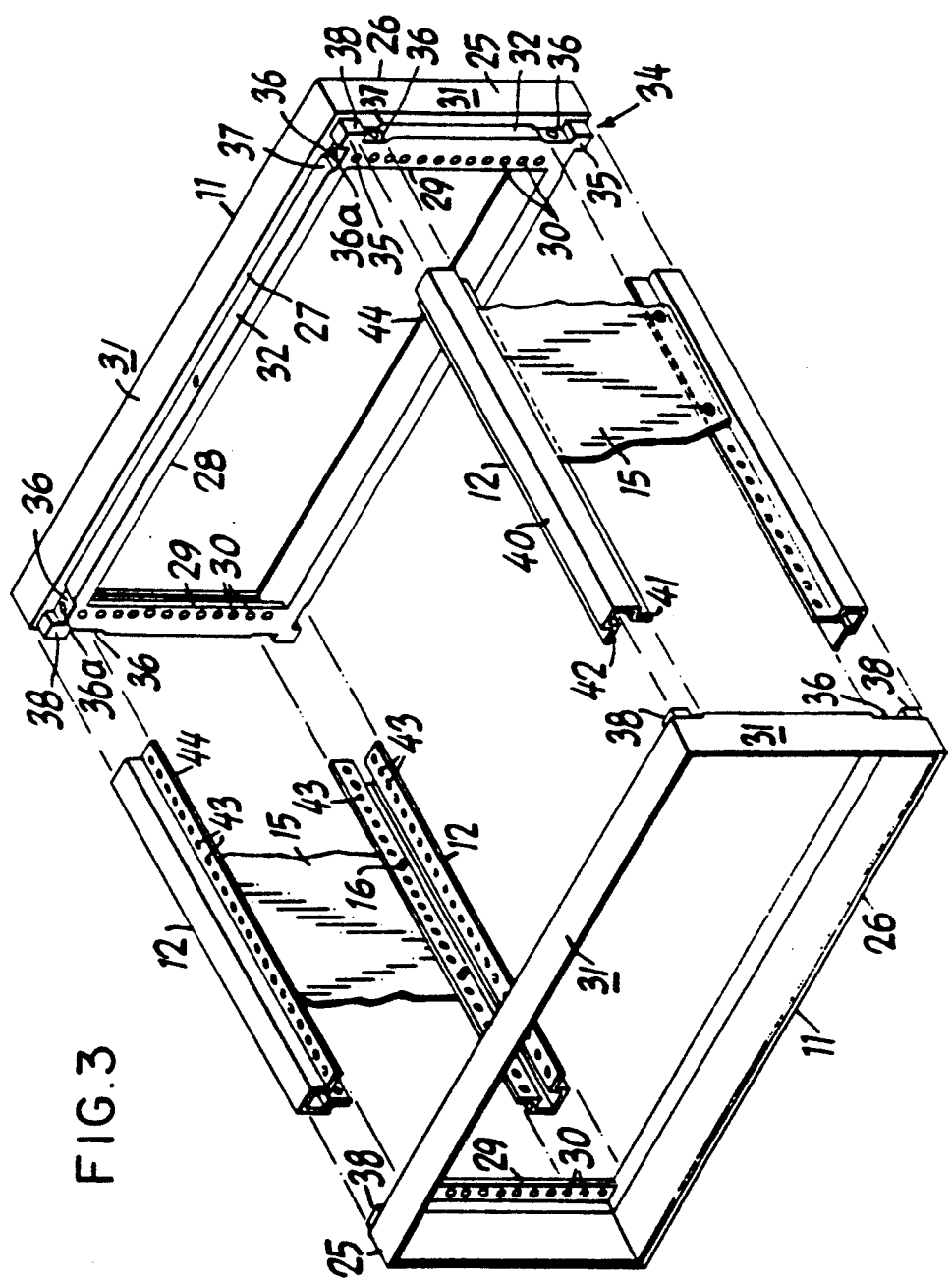
FIG. 3 is an exploded perspective view of the portable power distribution cabinet of FIG. 1.

Referring now to FIG. 3, each end frame 11 comprises a single cast aluminum piece including an end frame rail 25 extending as a rectangular rim to provide an outer edge 26 of the cabinet 10 and an interior, corner rail and panel receiving surface 27. Each end frame rail 25 defines a rectangular end opening for reception of a respective end panel 13, as illustrated in FIGS. 1 and 2. The corner rail and panel receiving surface 27 of the end frame rail 25 includes an integral interlock rim 28 raised from the corner rail and panel receiving surface 27, toward the interior of the cabinet 10, and extending around the entire rectangular extent of the end frame rail 25 at a position spaced inwardly from the outer top, side and bottom surfaces 31 of the end frame rail 25. A pair of end panel receiving surfaces 29 extend, one from either side of each raised interlock rim 28, into the rectangular opening defined by the respective end frame rail 25. In this manner, an end panel 13 can be received into the rectangular opening from the outer end 26 until it abuts against the end panel receiving surfaces 29 at a position recessed from the outer end 26 of the respective end frame rail 25. A series of threaded openings 30 is formed through each end panel receiving surface 29 for threaded reception of the screws 16 to removably secure the end panel 13 to the end frame 11, as described above.

Pursuant to a feature of the invention, each interlock rim 28, by virtue of its raised configuration toward the interior of the cabinet 10 and its position, spaced inwardly from the outer surfaces 31 of the respective end frame rail 25, defines a series of panel receiving surfaces 32 for support of the end edges 33 (See FIG. 1) of each top, side and bottom panel 14, 15, 17, respectively, recessed from the outer surfaces 31. The panel receiving surfaces 32 are separated from one another, at each corner 34 of the respective end frame rail 25, by an interlock member 35 integrally formed in the interlock rim 28.

As clearly illustrated in FIG. 3, each interlock member 35 comprises a pair of corner rail receiving grooves 36, disposed at a 90° angle relative to one another, and each defining a stop surface 37 intermediate the respective groove 36 and the adjacent panel receiving surface 32. Each groove 36 includes a threaded opening 36a to secure a corner rail 12, as will appear. The interlock rim 28 is formed at each corner, intermediate each pair of 90° disposed corner rail receiving grooves 36, as a generally rectangular solid 38, truncated at two sides thereof by the grooves 36, to provide an interlock element for reception within and mating with a complimentary end of one of the corner rails 12.

Figure 4:
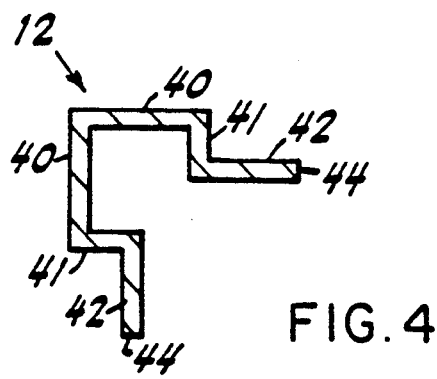
FIG. 4 is an end cross-sectional view of an extruded cabinet corner rail according to the present invention.

Referring now to FIG. 4, each corner rail 12 comprises an extruded section of aluminum including cabinet corner forming surfaces 40, disposed at 90° angles relative to one another and dimensioned to tightly receive, within the volume defined by the surfaces 40, one respective interlock element 38. The corner rail 12 also includes a pair of web portions 41, each disposed at a 90° to a respective corner forming surface 40 and together arranged to surround the truncated sides of the interlock element 38 and to integrally secure a pair of panel receiving surfaces 42, each one extending parallel to and offset from a complementary corner forming surface 40, as illustrated. Each panel receiving surface 42 is formed to a thickness approximately equal to the depth of the grooves 36 and is provided with a series of openings 43 (See FIG. 3) spaced longitudinally across the surface 42 to removably secure the panels 14, 15, 17, respectively, to the cabinet 10, by means of the screws 16 as described above. To that end, each panel is formed to include openings 43a arranged for alignment with the openings 43.

Accordingly, in the assembly of the cabinet 10, each end of each corner rail 12 is axially applied to a corresponding corner 34 of one of the end frames 11 such that the panel receiving surfaces 42 are each received within a respective groove 36 and the interlock element 38 is received within the volume defined by the corner forming surfaces 40 and web portions 41, until the end of the respective corner rail 12 abuts against the corner rail and panel receiving surface 27 of the end frame 11. Since each panel receiving surface 42 is of a thickness equal to the depth of the grooves 36, the panel receiving surfaces 42 at opposite corners of each end frame 11 will each be flush with the adjacent panel receiving surface 32 of the interlock rim 28, extending therebetween, to provide a continuous, recessed panel receiving surface from side-to-side of each side of the end frame 11.

Moreover, outer edges 44 of each panel receiving surface 42 will abut against the stop surface 37 of each respective groove 36. The abutment between the stop surfaces 37 and outer edges 44 of the respective panel receiving surfaces 42, the contact between the panel receiving surfaces 42 and the grooves 36, the contact between four outer surfaces of the rectangular solid interlock element 38 and the respective interior mating surfaces of the corner forming surfaces 40 and web portions 41, as well as the abutting contact between the end edge of the corner rail 12 and the corner rail and panel receiving surface 27 of the end frame 11, together provide a nine surface, multi-planar interlock between each corner rail 12 and the complimentary interlock member 35 of the end frame 11 for a high degree of structural integrity.

Each corner rail 12 can be secured at the corner interlock by a screw 16 received into openings 43 formed through the corner rail 12 at positions arranged to align with the threaded openings 36a of the grooves 36. When all four corner rails 12 are each interlocked with respective, opposed corners 34 of opposite end frames 11, a cabinet frame is provided for reception and mounting of the end, top, bottom and side panels 13, 14, 15, 17 to complete the cabinet construction.

Figure 5:
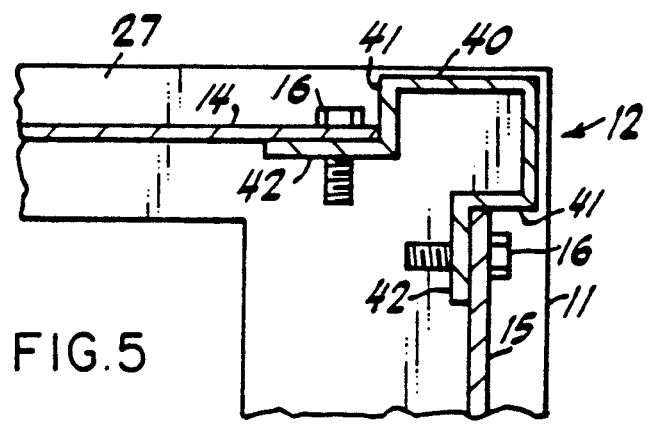
FIG. 5 is an end cross-sectional view taken at one corner of an assembled portable power distribution cabinet according to the present invention.

Referring to FIGS. 3 and 5, each panel receiving surface 42 extends from side-to-side of one corner side defined by a respective corner rail 12 within the cabinet frame formed by the corner rails 12 and the end frames 11. Moreover, due to the flush relation between the panel receiving surfaces 42 of the corner rails 12 and the panel receiving surfaces 32 defined by the raised interlock rims 28, as described above, a complete recessed rectangular panel receiving surface is formed around the entire perimeter of each of the top, bottom and each side of the cabinet 10. Thus, each panel 14, 15, 17 can abut against and be removably secured to a respective side, top or bottom of the cabinet frame by threaded engagement between the screws 16 and aligned openings 43, 43a to form the cabinet 10. Of course, as described above, the end panels 13 are mounted to the panel receiving surfaces 29 of the end frames 11.

Figure 6:
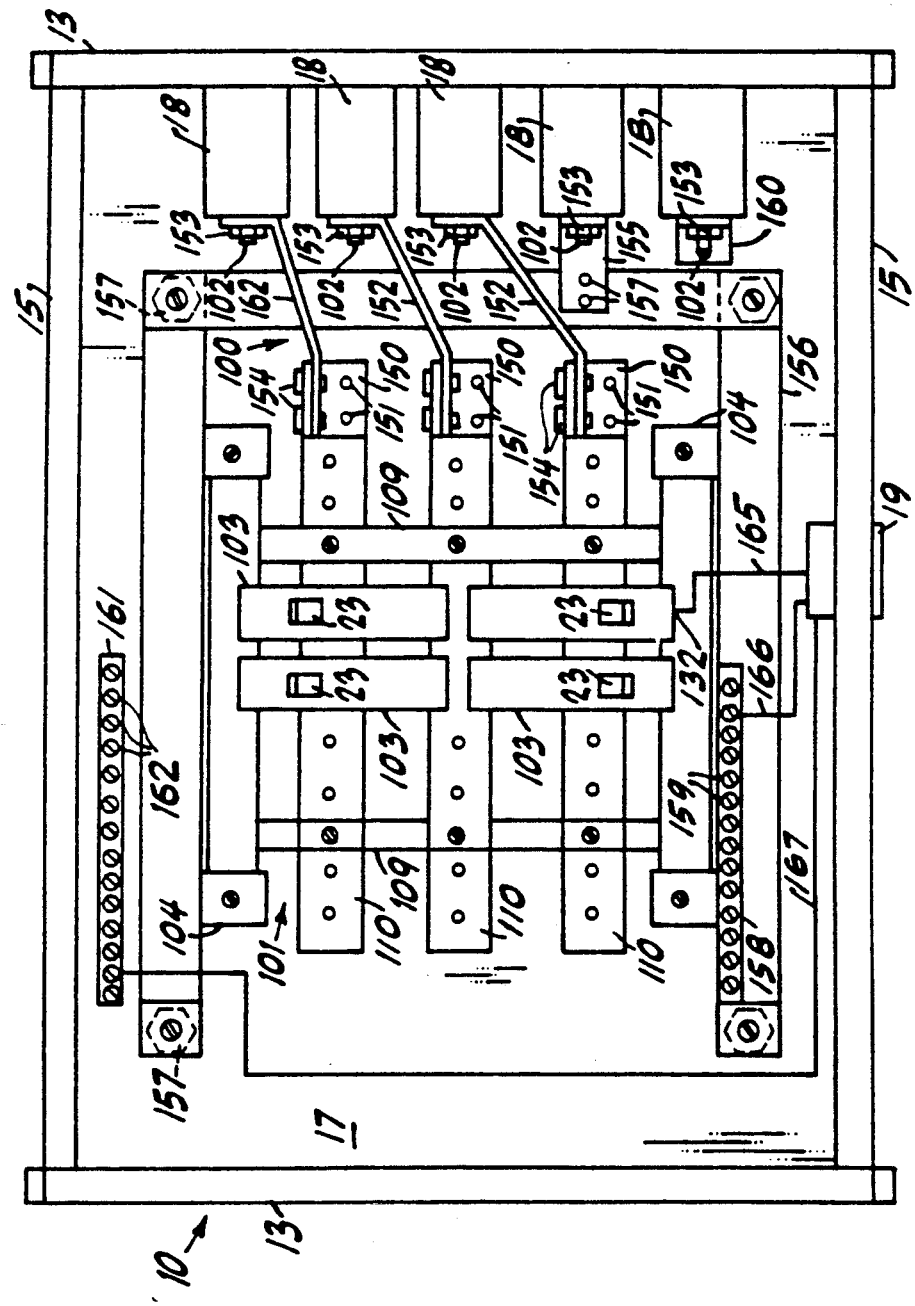
FIG. 6 is a top plan view of the interior of the portable power distribution cabinet of FIG. 1, arranged as a branch feed type cabinet.

Referring now to FIGS. 6 & 7, there is illustrated the interior of an assembled cabinet 10 according to the present invention. As described above, the panels of the cabinet 10 mount various preselected electric connectors, e.g., connectors 18, 19, to provide a desired connectivity as a main power feed, trunk feed and/or branch circuit feed. The interior of the cabinet 10 is provided with a bus feed arrangement 100 and circuit breaker chassis 101 for selective, removable intercoupling of the panel mounted connectors with each other.

For example, each connector 18 mounted on one of the end panels 13 of the cabinet 10, can comprise a high capacity, plug-in type connector having a threaded terminal 102 on the interior side of the cabinet 10. For coupling to a three phase electric system, five connectors 18 are mounted to the end panel 13, one for each of the three phases, a neutral terminal and a ground terminal.

The chassis 101 is mounted on the bottom panel 17 within the interior of the cabinet 10, and is illustrated in exploded form in FIG. 7. The chassis 101 provides, e.g., a mounting for two side-by-side arrays of circuit breakers 103, each removably received into the chassis 101. Generally, the chassis 101 comprises four corner support elements 104, each having mounting tabs 105 for mounting to the panel 17, as for example by screws (not specifically illustrated). Each pair of support elements 104, on one side of the chassis 101, support a breaker mounting rail 106 therebetween. The breaker mounting rails 106 are each formed to include a plurality of tabs 107 spaced along the length of the rail 106 between the respective support elements 104. Each circuit breaker 103 includes a recess 108 formed in a front portion, for reception of a respective tab 107 when mounted on the chassis 101, for support.

A series of cross-rails or bus isolators 109 extend between the breaker mounting rails 106 to mount three feed buses 110, as for example by screw 111, washer 112 combinations threadibly received through aligned openings 113, 114 formed in the feed buses 110 and cross-rails 109, respectively, as illustrated in FIG. 7. Each feed bus 110 corresponds to one phase of a three phase system which can be, e.g., a three phase 120/208 volt, 4 wire Y service. The bus isolators 109 are made from an electrical insulator material and the feed busses 110 are made from an electrical conductor such as, e.g., copper.

Each feed bus 110 includes a series of connector link openings 115 formed along the length thereof. A plurality of generally inverted U-shaped connector links 116 are mounted to the middle feed bus 110. To that end, each connector link 116 includes a pair of outwardly extending portions 117, each provided with an opening 118 arranged to align with one of the openings 115 of the middle feed bus 110. Screws 119, e.g.,self taping hex head screws, are used to secure each connector link 116 to the middle feed bus 110. Each connector link 116 is formed to include a pair of breaker connector openings 116a.

Likewise, a series of generally planar connector links 120 are secured to each outer feed bus 110 by screws 119, each received through a respective opening 121 formed in each connector link 120 and aligned with one of the openings 115 of a respective outer feed bus 110. Each connector link 120 includes a raised portion 122 extending from the respective outer feed bus 110 to a position aligned over the middle feed bus 110. Each raised portion 122 includes a pair of breaker connector openings 120a.

The generally inverted U-shaped connector links 116 and generally planar connector links 120 are arranged, relative to one another, to provide an alternating sequence of breaker connector opening pairs 116a, 120a aligned with and spaced along the middle bus feed 110. Moreover, each pair of breaker connector openings 116a, 120a is aligned with a pair of tabs 107, one on each breaker mounting rail 106. Each circuit breaker 103 includes a terminal 130 having an opening 130a such that the circuit breaker 103 can be removably mounted to the chassis 101 by applying the recess 108 of the circuit breaker 103 over one of the tabs 107 of a respective breaker mounting rail 106, for support, and screwing the terminal 130 to one of the pair of breaker connector openings 116a, 120a aligned with the respective tab 107, with a screw 131.

As should be understood, the above-described chassis 101 will removably mount a plurality of circuit breakers 103 within the interior of the cabinet, in two side-by-side arrays, due to the plurality of tabs 107 and aligned pairs of breaker connector openings 116a, 120a. Each connector tab 116, 120 forms an electrical connection between each respective circuit breaker terminal 130 and one of the feed buses 110. For one phase service, e.g., 120/240 volt, 3 wire service, the middle feed bus 110 can be removed from the chassis 101.

As illustrated in FIG. 7, each circuit breaker 103 includes a switch 23 that is accessible to a user through the use of the hinged panel door 21 (See FIG. 2), as described above. In addition, each circuit breaker 103 is provided with a second terminal 132 for selective coupling to one of the connectors, e.g., one of the connectors 19 mounted on side panels 15 (See FIGS. 1 and 6), such that each connector 19 is selectively coupled to one of the feed buses 110 via a respective circuit breaker 103, for individual overcurrent protection for a branch load supplied by the connector 19.

Two pole circuit breakers can also be mounted on the chassis 101. Each two pole circuit breaker would align with and be mounted to two adjacent tabs 107 and connect to two of the feed busses 110. Two pole circuit breakers would be used to supply a higher voltage branch load, if desired. Likewise, three pole breakers can be mounted to the chassis 101 for a three phase connection to a branch feed connector to energize, e.g., a delta motor load. Thus, the chassis 101 provides flexibility in the type of circuit breaker 103 that can be removably mounted within each cabinet 10.

Each feed bus 110 is arranged to extend beyond the outer cross-rails 109 and is provided with openings 133 for coupling to the bus feed arrangement 100. Referring now to FIG. 6, an L-shaped bus connector 150 is received upon the end of a respective feed bus 100 extending beyond the outer cross-rail 109. The L-shaped bus connector 150 includes openings arranged to align with the openings 133 of the respective feed bus 110 for secure mounting thereon, as for example, by screws 151. The terminal 102 of each one of the three connectors 18 corresponding to the three phases of the three phase system, is connected to a bus feed 152, by a nut 153. Each one of the bus feeds 152 extends to a corresponding L-shaped bus connector 150 and is secured thereto by screws 154.

Accordingly, the bus feed 152, L-shaped bus connector 15 arrangement electrically couples each one of the feed buses 10 to a corresponding connector 18. Thus, each connector 18 can be coupled to a source of electric power by a plug-in cable, as described above, to energize the three feed buses 110, and through the breaker tabs 116, 120 and terminals 130, energize each second terminal 132 of each circuit breaker 103 mounted within the circuit breaker chassis 101.

The terminal 102 of the fourth connector 18 is secured to an L-shaped bus connector 155 by a nut 153, and the L-shaped bus connector 155 is, in turn, secured to a neutral bus 156, e.g., by a pair of screws 157. The neutral bus 156 is mounted in a raised position above the bottom panel 17 by insulator posts 157 and extends around the end and two sides of the circuit breaker chassis 101. One or more electrically conductive connector strips 158 are mounted on the neutral bus 156. Each of the connector strips 158 includes a plurality of individual connector openings 159 to provide a neutral coupling for each side panel mounted connector 19, as will appear.

Furthermore, the terminal 102 of the fifth connector 18 mounted on the end panel 13 is connected to another L-shaped bus connector 160 by a nut 153. The L-shaped bus connector 160 is fastened to the bottom panel 17 to provide a common ground within the cabinet 10 that can be coupled through the fifth connector 18 to the common ground of other cabinets 10 and the ground of the source of power, e.g., a generator. Moreover, one or more connector strips 161 are mounted to the bottom panel 17. Each of the connector strips 161 includes a plurality of individual connector openings 162 to provide a ground coupling for each side panel mounted connector 19, as will appear.

For illustration purposes, a single connector 19 is depicted in FIG. 6. However, it should be understood that several connectors 19, of any desired type can be mounted to the side panels 15 for connection to branch circuits. In addition, the circuit breaker chassis 101 is arranged to mount one circuit breaker 103 for each connector 19.

As illustrated, the connector 19 includes three leads 165, 166, 167 arranged to extend into the interior of the cabinet 10 when the panel 15 mounting the connector 19 is secured to the cabinet 10. The first lead 165 is selectively coupled to a connector 132 of one of the circuit breakers 103, the second lead 166 is selectively coupled to one of the connector openings 159 of the connector strip 158 mounted on the neutral bus 156 and the third lead 167 is coupled to one of the connector openings 162 of the connector strip 161 mounted on the bottom panel 17 for a ground connection. Thus, the connector 19 in this example is easily coupled to one phase of the three phase system, the neutral terminal of the three phase system and to the common ground and includes a circuit breaker 103 for individual overcurrent protection. Of course, when two pole or three pole breakers are used, the branch connectors could have three or four leads for connection to two or three connectors 132 of a two pole or three pole circuit breaker, respectively, for connection to two or all three phases of the three phase system to provide various voltage outputs from the three phase system.

The removable coupling of the leads 165-167 facilitates easy disconnection of each connector 19 from the circuit breaker 103, neutral bus 156 and ground 161 when the panel 15 mounting the connector is to be removed for installation of another panel 15 mounting a different type of connector. Likewise, each circuit breaker 103 is easily removed and replaced within the breaker chassis 101.

Figure 6A:
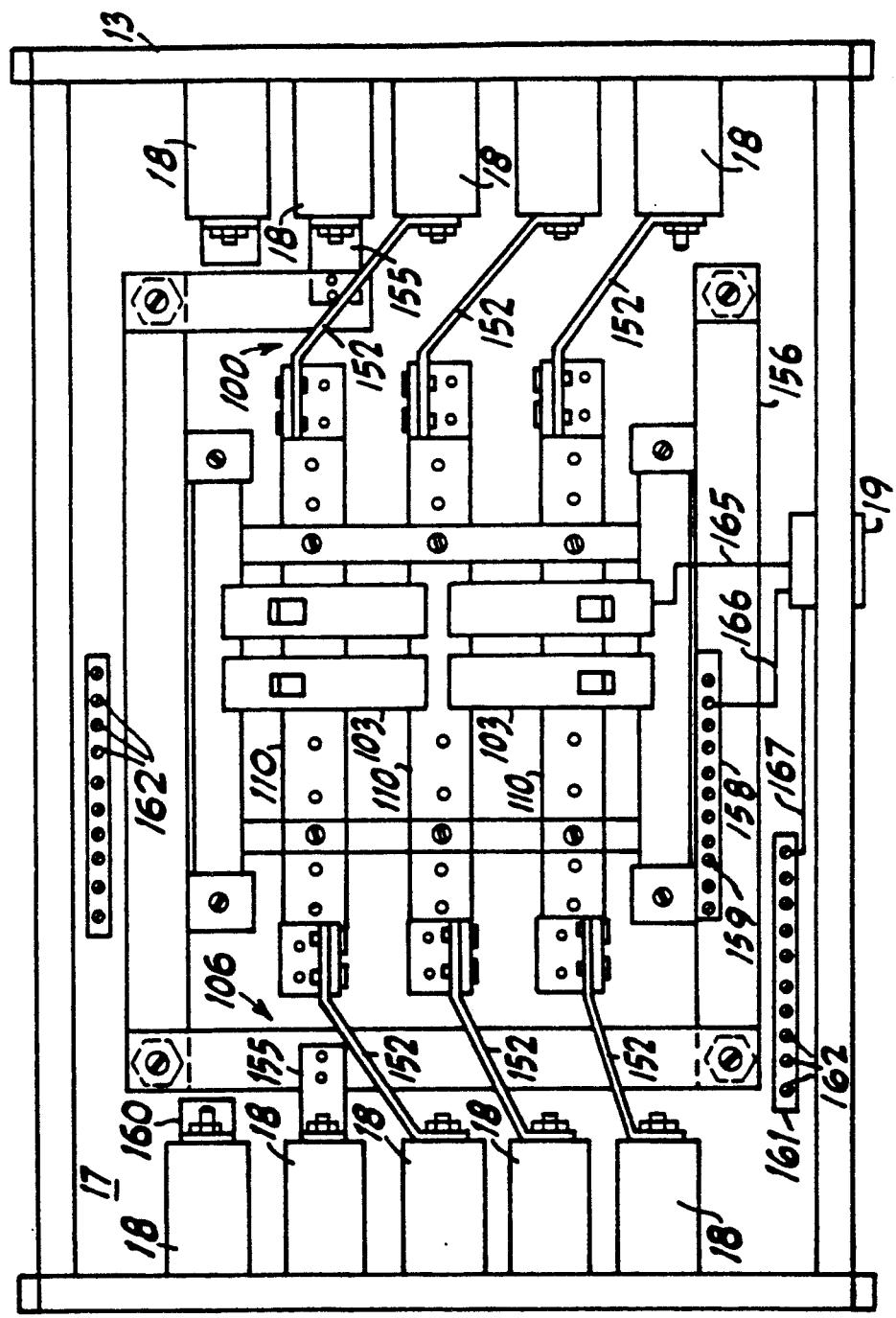
FIG. 6a is a top plan view of the interior of the portable power distribution cabinet of FIG. 1, arranged as a trunk feed type cabinet.

The cabinet 10 depicted in FIG. 6 is arranged as a branch feed type cabinet. Referring to FIG. 6a, there is illustrated a top plan view of a cabinet 10, similar to the cabinet of FIG. 6, except that the cabinet 10 depicted in FIG. 6a includes a five connector 18, bus feed 100 arrangement installed on each end panel 13 of the cabinet 10, to provide a trunk feed type cabinet. A series of such trunk feed type cabinets 10 can be arranged as trunk feeds in a network. For example, the connectors 18 on one end panel 13 can be female type plug-in connectors and the connectors 18 on the other end panel 13 can be male type plug-in connectors such that flexible cables, having male and female ends, can couple the trunk feed type cabinets in series.

Figure 6B:
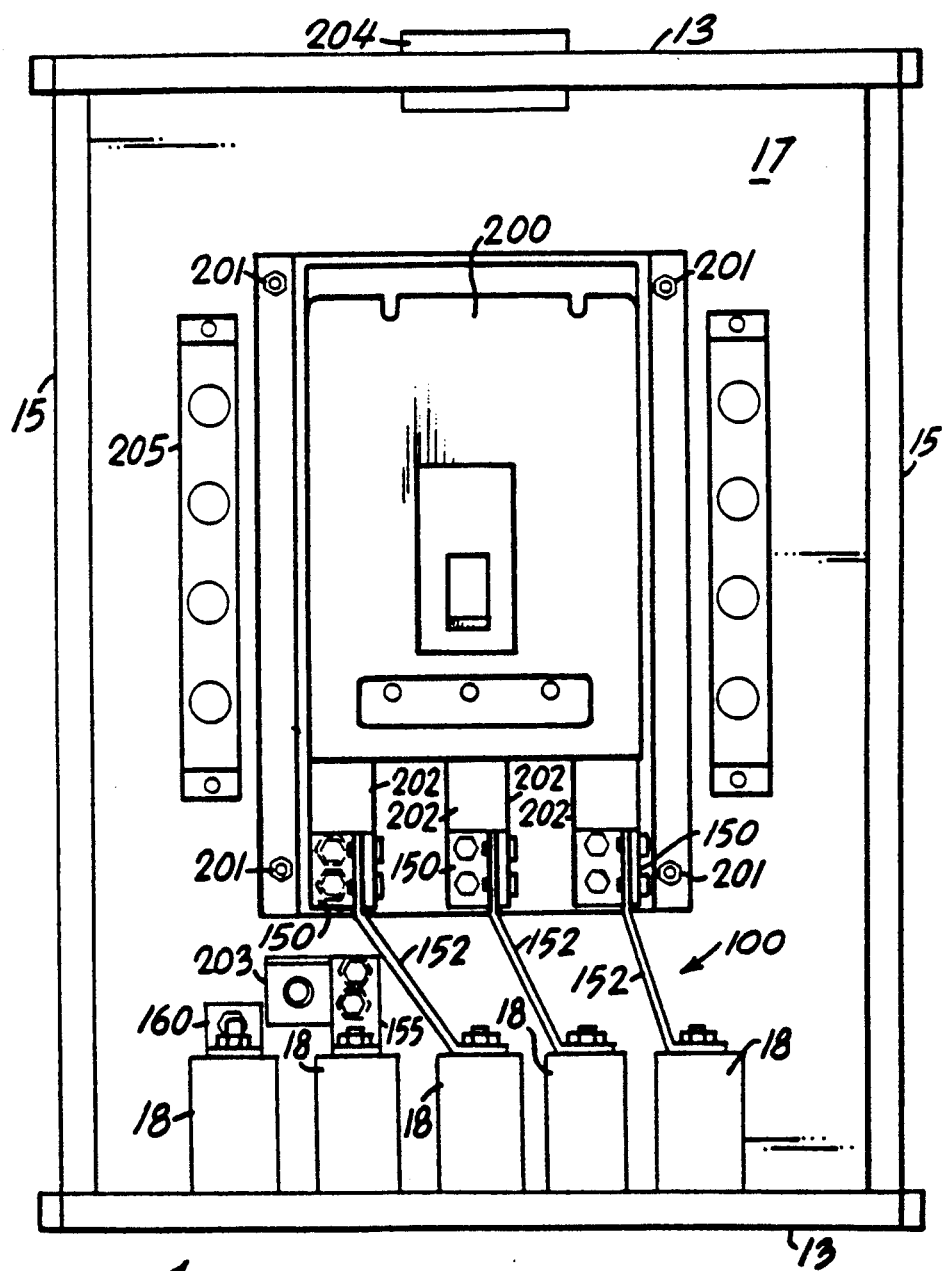
FIG. 6b is a top plan view of the interior of the portable power distribution cabinet of FIG. 1, arranged as a main power feed type cabinet.

Referring now to FIG. 6b, there is illustrated a cabinet 10 arranged as a main power feed cabinet. A main circuit breaker 200 is mounted within the cabinet 10 on bottom panel 17, as for example by a nut and bolt arrangements 201. One end panel 13 is provided with five connectors 18 coupled to a feed bus arrangement 100, as in the cabinet illustrated in each of FIGS. 6 and 6a. The buses 152 from three connectors 18 are each coupled to an L-shaped connector 150, which is in turn, mounted on an output bus bar 202. Each output bus bar 202 is coupled to one output of the three phase output of the main circuit breaker 200. Each output bus bar 202 can be mounted on insulator posts, secured to the bottom panel 17, for support (not specially illustrated).

A neutral connector 203, also supported on an insulator post secured to the bottom panel 17, is coupled to the L-shaped bus connector 155 connected to a forth one of the connectors 18, acting as a neutral terminal, as described above. Furthermore, similar to the embodiment of FIGS. 6 and 6a, a fifth connector 18 mounted on the end panel is coupled by L-shaped ground connector 160 to the bottom panel 17.

Accordingly, the five connector 18, feed bus arrangement 100 of the end panel 13 provides connectivity to one of the trunk type cabinets 10, as illustrated in FIG. 6a, to provide a source of power to a network coupling trunks and branches formed by the cabinets 10 of the types illustrated in FIGS. 6 and 6a.

The opposite end panel 13 of the main power feed cabinet 10 is provided with a generally cylindrical, hollow power conduit 204 to insert a main power feed from, e.g., a public utility source or a power generator (not specifically illustrated). The individual phase cables of the main power feed can be coupled to the three phase inputs of the main circuit breaker 200, and the neutral cable can be coupled to the neutral connector 203. The cabinet 10 itself can be grounded to a common ground with the source of power, which ground connection is connected throughout the network via the connector 160, fifth connector 18 arrangement of each cabinet 10, as illustrated in FIGS. 6, 6a and 6b.

A bracket 205 can be mounted within the cabinet 10 to support, e.g., indicator lights indicative of the operation of the network, if desired.

Figure 8:
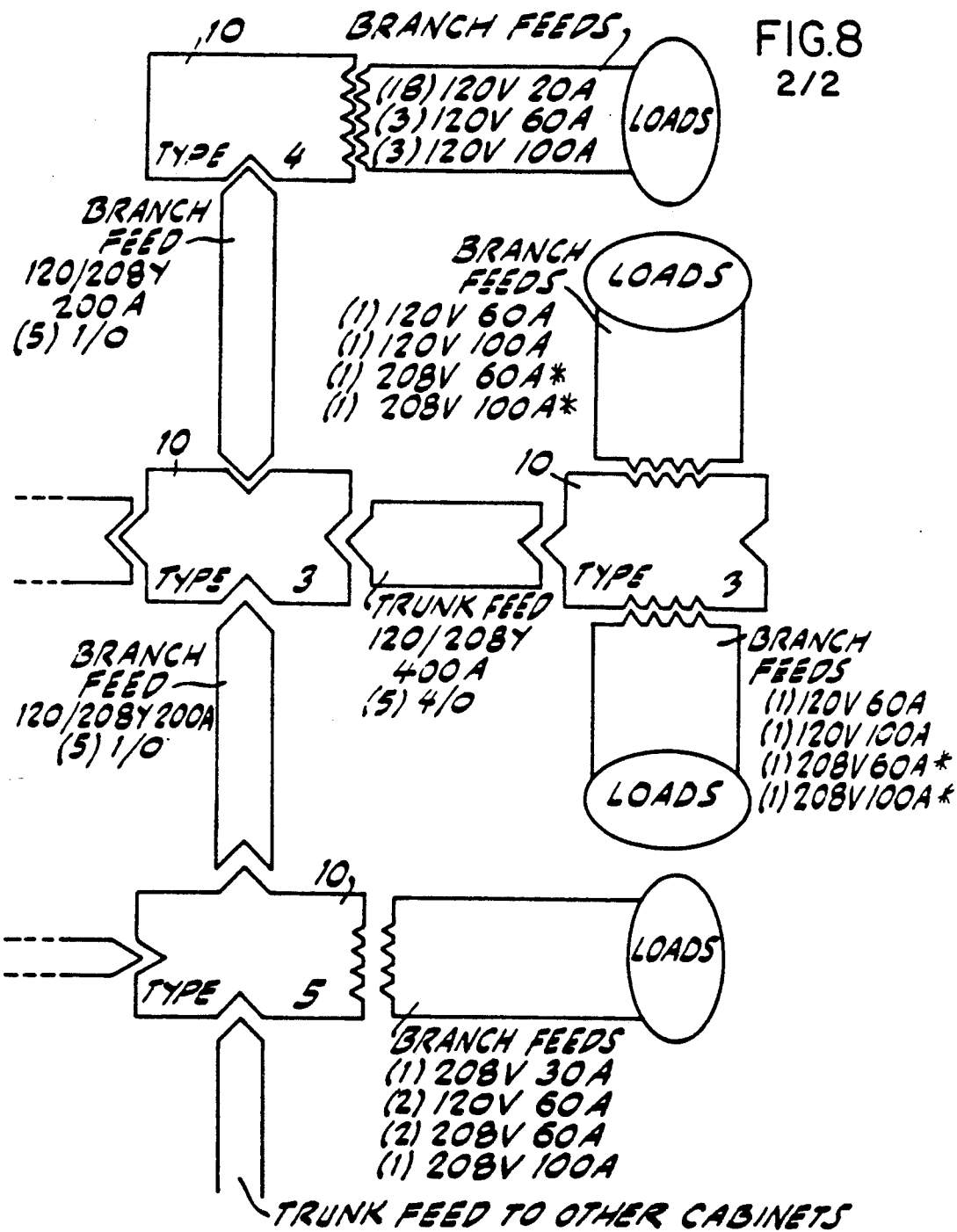
FIG. 8 is a block diagram illustration of a power distribution network comprising an array of portable power distribution cabinets according to the present invention.

Referring now to FIG. 8, there is depicted a block diagram of an example of a network comprising several cabinets according to the present invention. Each type 1-7 for the cabinets 10 corresponds to the type, quantity and power characteristics of the connectors mounted in the side and end panels, as indicated on the drawing of FIG. 8. As should be appreciated, any configuration for the network and any type of connectivity for each main power feed, trunk and branch cabinet 10 within the network is readily achievable due to the modular construction of the cabinet according to the present invention. Moreover, each cabinet 10 will be light-weight, durable and of a high structural integrity.

Figure 9:
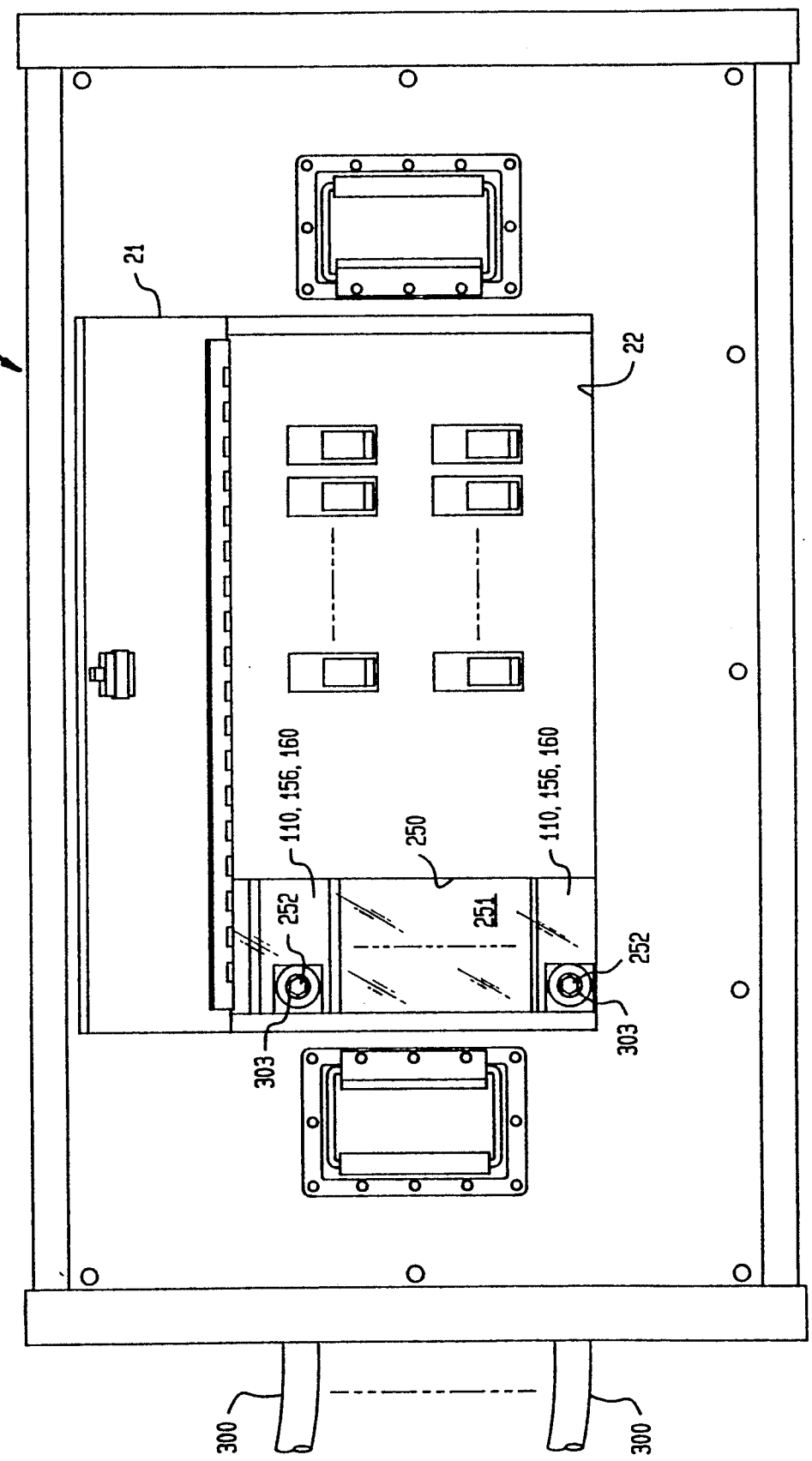
FIG. 9 is a top view of the portable power distribution cabinet of FIG. 1 arranged to provide a direct coupling between lugged power feed cables and the internal bus feed arrangement of the cabinet.

Referring now to FIGS. 9-14, there is illustrated a portable power distribution cabinet according to the present invention arranged with a direct access panel to permit the direct coupling of lugged cables to the feed busses 100 of the cabinet 10. As shown in FIG. 9, the switch housing 22 is provided with an opening 250 for direct access to each of the busses 110, neutral bus 156 and L-shaped ground connector 160 mounted within the cabinet 10. In this manner, set screws 303 of lugs 301, as, e.g., sister lugs, soldered to cables 300 can be reached to fasten the lugged cables 300 to the appropriate busses or ground connection without having to remove any panels from the cabinet 10, as will appear.

The hinged door 21 is ordinarily closed to isolate the interior of the cabinet 10 and thereby prevent exposure to the electrical connections within the cabinet 10. Moreover, a transparent plastic panel 251 is mounted within the opening 250 to prevent electric shock hazard when the hinged door 21 is open. The transparent panel 251 can comprise a Lexan ® window to provide a heavy duty, heat resistant, transparent window for shock prevention. however, the transparency of the Lexan ® window 251 will enable a worker to view the lugged cables 300, busses 110, 156 and ground connection 160.

The transparent panel 251 is formed to include a plurality of relatively small diameter holes 252. Each one of the holes 252 is aligned with one of the set screws 303 of one of the sister lugs 301 when the corresponding cable 300 is inserted into the cabinet 10, as will be described below. The diameter of each hole 252 is dimensioned so that the worker can insert a tool, such as an Allen tool, therethrough to engage the aligned set screw 303 and thereby secure the cable 300 to the respective bus 110, 156 or ground connection 160. Accordingly, the opening 250, transparent panel 251 arrangement provides a full view of the lugged cables 300, busses 110, 156 and ground connection while isolating a worker from electric shock hazard and permitting access for a tool for engagement with the set screws 303.

Figure 10:
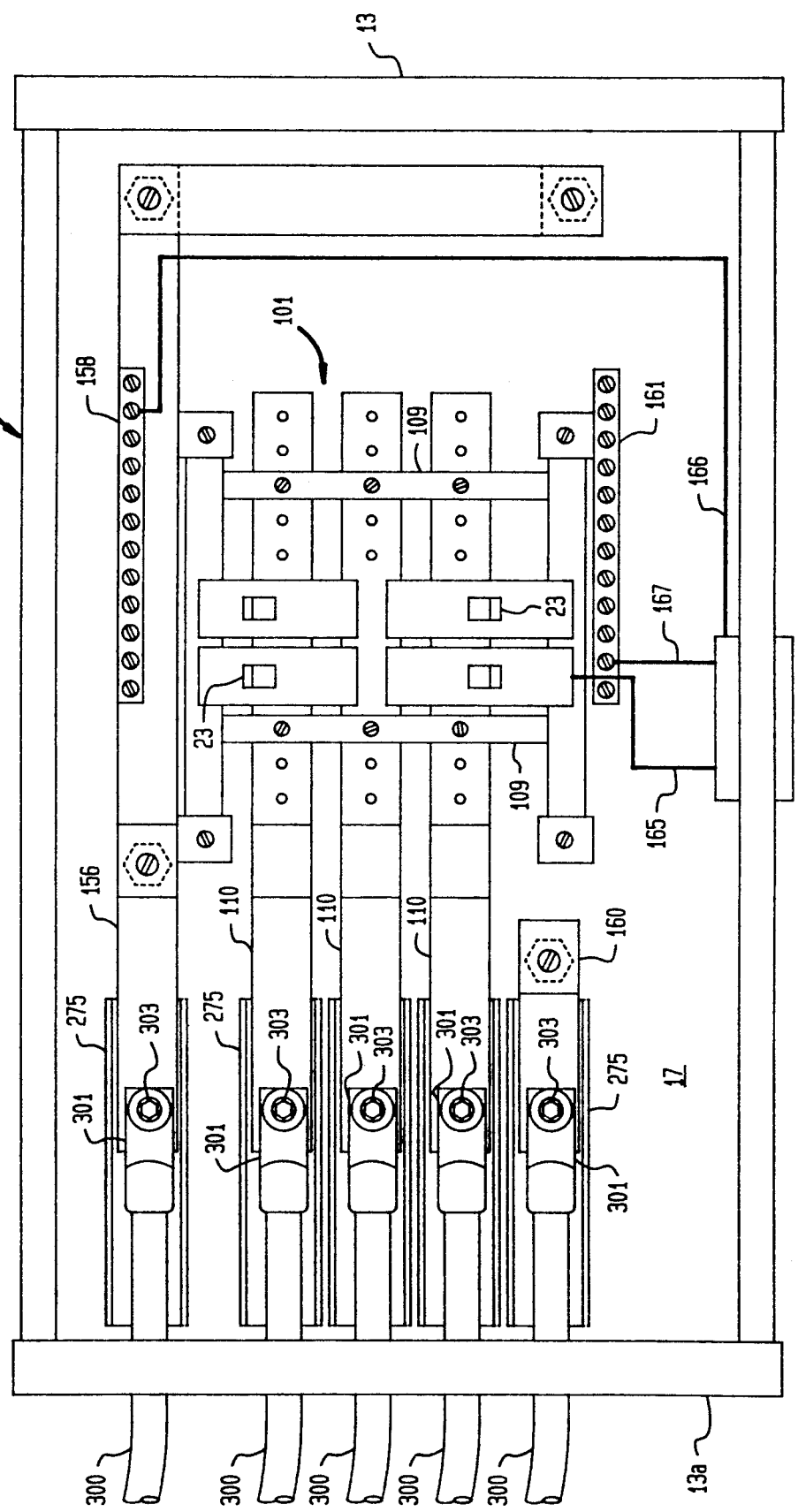
FIG. 10 is a top plan view of the interior of the portable power distribution cabinet of FIG. 9.
Figure 11:
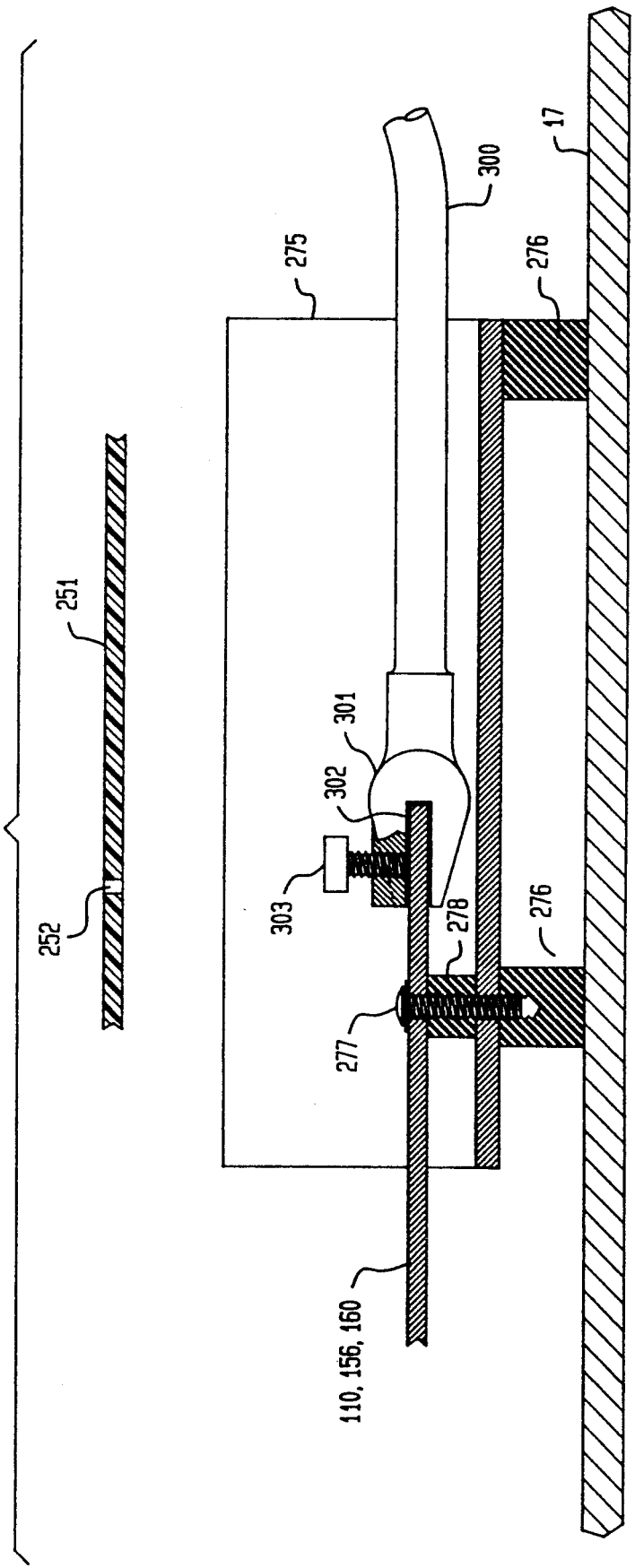
FIG. 11 is a side, partial cross-sectional view of one of the lugged power feed cable, bus feed couplings of the portable power distribution cabinet of FIG. 10.

As illustrated in FIGS. 10 and 11, the interior of the cabinet of FIG. 9 is modified to accommodate the direct coupling of lugged cables to the bus arrangement. The interior of the cabinet 10 illustrated in FIG. 10 is generally similar to the interior of the cabinets 10 shown in FIGS. 6, 6a and 6b, with like reference numerals corresponding to the same components. However, in the cabinet 10 of FIG. 10, each of the feed buses 110, the neutral bus 156 and L-shaped common ground connector 160 is arranged to extend within a U-shaped cable guide 275 mounted to the bottom panel 17 by insulated bushings 276 (See FIG. 11). Each of the buses 110, 156 and ground connector 160 is secured to a respective cable guide 275 by a screw 277 received through each of an insulated spacer 278 and the respective cable guide 275 and threaded into one of the insulated bushings 276, as illustrated in FIG. 11. In this manner, when a power cable 300 is inserted into the cabinet 10, as will be described in more detail with reference to FIG. 13, it will be received into a respective one of the cable guides 275 for guided movement toward a corresponding one of the buses 110, 156 or ground connector 160.

As described above, each power cable 300 is provided with a sister lug 301 having a set screw 303. The sister lug 301 is also formed to include a U-shaped opening 302. The U-shaped opening 302 of each lug 301 is directly received over a respective one of the buses 110, 156 or ground connector 160 and the set screw 303 is turned until it mechanically secures the lug 301 for an electrical connection with the respective bus 110, 156 or ground connector 160, as illustrated in FIG. 11. As should be understood, the opening of the hinged panel 21 exposes the sister lugs 301 through the holes 252 of the transparent panel 251 for placement and securing or removal of the power cables 300 to or from the buses 110, 156 or ground connector 160, as the case may be (See also FIG. 9).

Figure 12:
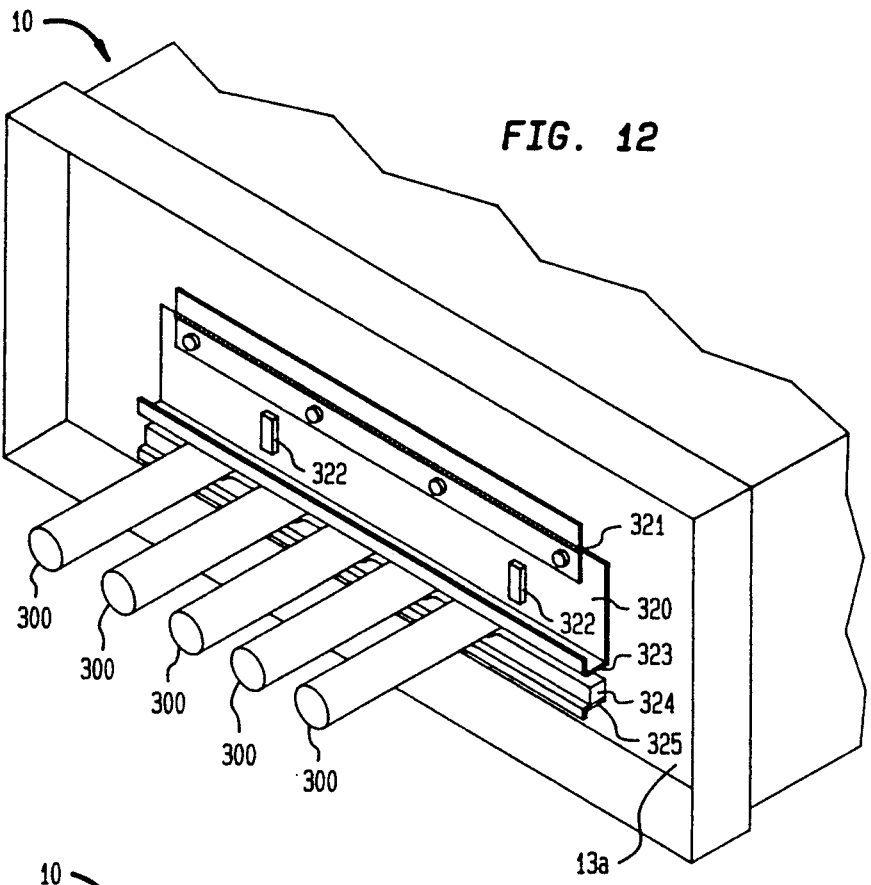
FIG. 12 is a front view of the portable power distribution cabinet of FIG. 9.
Figure 13:
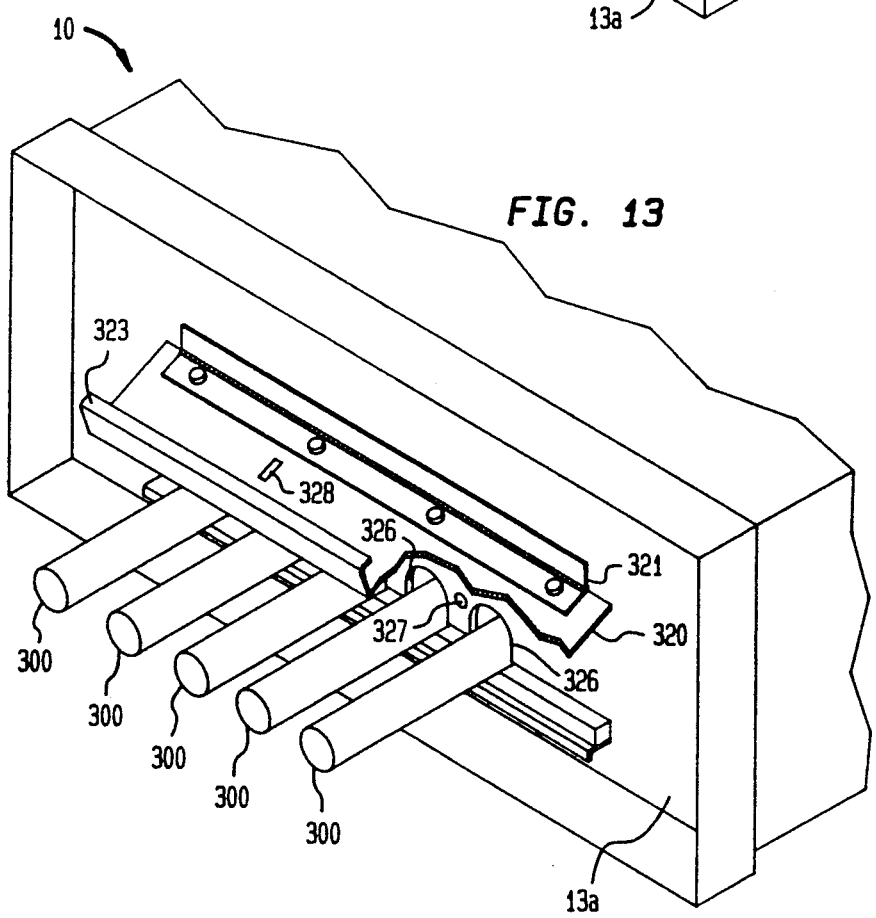
FIG. 13 is a further front view of the portable power distribution cabinet of FIG. 9 illustrating the clamp door of FIG. 12 partially cut away and in an open position.

FIGS. 12 and 13 illustrate a direct access end panel 13a mounted to the cabinet 10 for direct coupling of lugged cables 300 to the interior bus arrangement of the cabinet 10. The direct access end panel 13a is provided with a cable clamp door 320 rotatably mounted to the panel 13a by a piano hinge 321. As shown in FIG. 12, the cable clamp door 320 is fixed in a closed position by a pair of threaded studs 322. When in the closed position, a U-shaped lower end 323 of the door 320 engages and clamps the cables 300 against a neoprene gasket 324 that is mounted along a metal stress angle strip 325 fixed to the end panel 13a. The clearance between the end 323 of the door 320 and the gasket 324 is fixed so that the clamping action on the cables 300 is sufficient to hold the cables 300 against any mechanical forces as would likely be encountered in the operating environment of the cabinet 10. Thus, the engagement between the end 323 of the door 320, the cables 300 and the gasket 324 of the stress angle strip 325 provides stress relief to mechanical forces applied to the cables 300 during use of the cabinet 10. Accordingly, such mechanical forces will not be applied directly to the set screws 303 of the cables 300 to maintain the integrity of the electrical connections. Moreover, in the event of a solder meltdown due to an electrical overload or arcing caused by a loose connection, the cables 300 will be maintained in a fixed position by the clamping action of the door 320.

As shown in FIG. 13, the direct access end panel 13a is formed to include a plurality of openings 326, one for each cable 300. Each one of the openings 326 is aligned with one of the U-shaped cable guides 275 so that when a cable 300 is inserted into the opening, it is received into the corresponding cable guide 275 for guided movement toward a respective bus 110, 156 or ground connection 160 for connection, as described above.

Figure 14A:
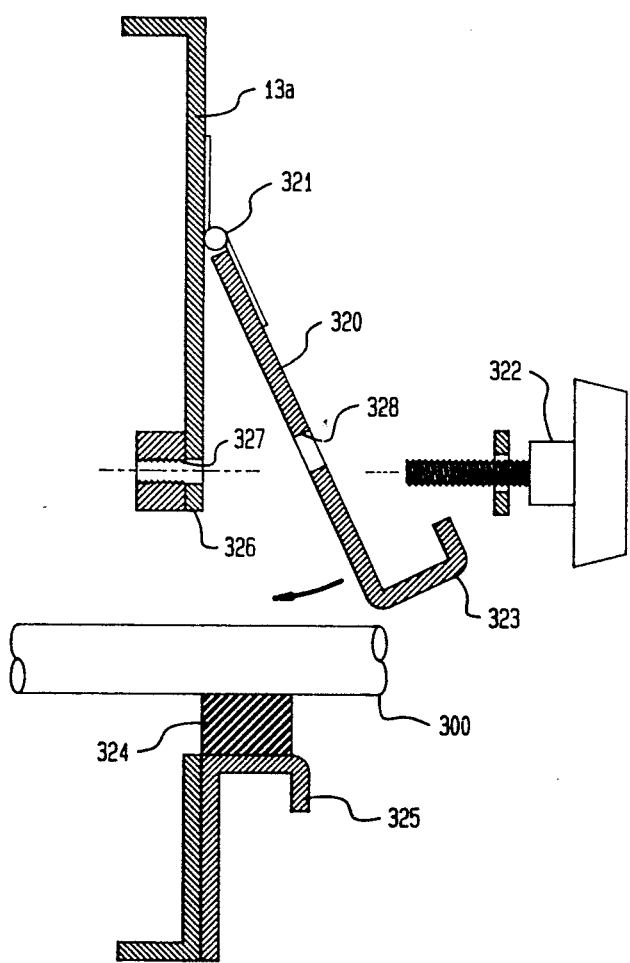
FIG. 14A is a side, cross-sectional view of the clamp door arrangement of the portable power distribution cabinet of FIGS. 12 and 13 with the clamp door in an open position.

Referring now to FIG. 14a, there is illustrated a side cross-sectional view of the direct access end panel 13a of FIGS. 12 and 13, with the threaded studs 322 removed and the cable clamp door 320 in an open position. The end panel 13a is provided with a pair of threaded openings 327 (only one illustrated). Moreover, a pair of slots 328 (only one illustrated) is formed in the cable clamp door 320 and each of the slots 328 is positioned to be aligned with a corresponding one of the threaded openings 327 of the end panel 13a when the door 320 is in the closed position. In this manner, each of the threaded studs 322 can be received through one of the slots 328 and threaded into the corresponding aligned threaded opening 327 to secure the cable clamp door 320 in the closed, cable clamping position (See FIG. 14B).

Figure 14B:
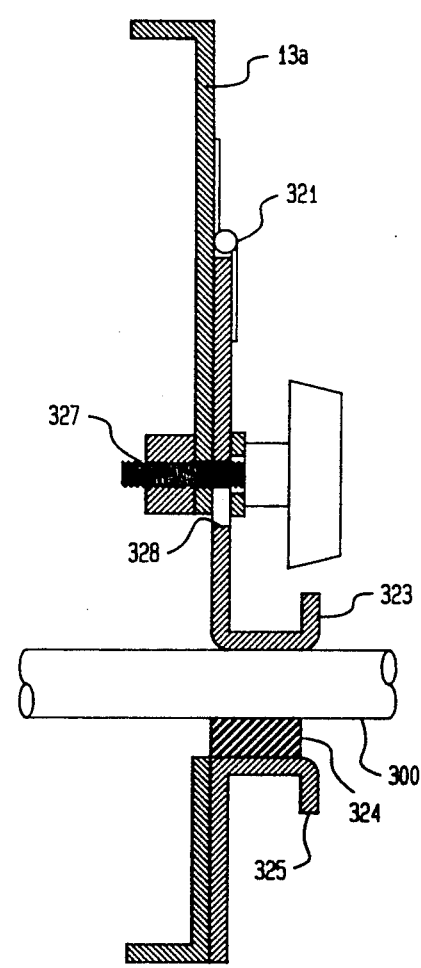
FIG. 14B is a side, cross-sectional view of the clamp door arrangement of the portable power distribution cabinet of FIGS. 12 and 13 with the clamp door in a closed position.

When the cable clamp door 13a is in the open position, each cable 300 is easily inserted through a preselected one of the openings 326 for coupling to a corresponding bus 110, 156 or ground connector 160 (See FIGS. 9 and 10) via a tool inserted through the respective hole 252 of the transparent panel 251 exposed by the hinged panel 21. Once the cables 300 are coupled to the buses 110, 156 and ground connector 160, each of the hinged panel 21 (FIG. 1) and the cable clamp door 320 is closed (FIG. 14B). The threaded studs 322 are then threaded into the threaded openings 327 to secure the cable clamp door 320 in the closed, cable clamping position.

The direct access end panel 13a of the present invention provides a convenient, labor efficient device for direct coupling of lugged cables 300 to the bus arrangement within the cabinet 10. The hinged cable clamp door 320 simultaneously clamps all of the cables 300 inserted through the openings 326 of the end panel 13a in one operation for ancillary stress relief. In addition, the dimensions of the openings 326 can be arranged so that the placement of the closed door 320 substantially seals the interior of the cabinet 10.

What is claimed is:

1. A stress relief device for a cable-like element, which comprises:
    a panel forming an opening for passage of the cable-like element therethrough; and
    a door rotatably mounted to the panel for rotation between an open position and a closed position and arranged so that the door is clear of obstruction of the opening when in the open position and partially obstructs the opening when in the closed position;
    each of the panel and the door being dimensioned relative to one another so that said door engages and clamps the cable-like element against said panel when the cable-like element is passed through the opening and the door is in the closed position.

2. The stress relief device of claim 1, wherein the door is hingedly connected to the panel.

3. The stress relief device of claim 1 further comprising a fastener for securing the door in the closed, cable clamping position.

4. The stress relief device of claim 3, wherein the fastener comprises a threaded stud, the door is formed to include a slot opening for reception of the threaded stud and the panel is formed to include a threaded opening aligned with the slot opening of the door when the door is in the closed position for threaded engagement with the threaded stud to fasten the door in the closed position.

5. The stress relief device of claim 1, wherein the door is formed to a U-shaped end for clamping engagement with the cable-like element when the door is in the closed position.

6. The stress relief device of claim 5, wherein the panel is formed to include a stress angle strip for supporting the cable-like element when the element is passed through the opening.

7. The stress relief device of claim 6 further comprising a gasket mounted on the stress angle strip for supporting the cable-like element when the element is passed through the opening.

8. The stress relief device of claim 1, wherein the panel forms a plurality of openings for passage of a plurality of cable-like elements, one through each of the plurality of openings, and wherein the door partially obstructs all of the openings when in the closed position to simultaneously engage and clamp the plurality of cable-like elements against said panel when the cable-like elements are passed through the respective openings and the door is in the closed position.

9. A portable power distribution cabinet, which comprises:
    side, end, top and bottom panels connected to one another to form an enclosure;
    a plurality of electrical conductors mounted within the enclosure;
    the electrical conductors including power input and output conductors adapted for direct coupling to lugged cables;
    one of the panels forming a plurality of openings for passage of lugged cables therethrough, one of the lugged cables per opening, for passage of the lugged cables into the enclosure for direct coupling of the lugged cables to the power input and output conductors;
    a door rotatably mounted to the one panel for rotation between an open position and a closed position and arranged so that the door is clear of obstruction of the openings when in the open position and partially obstructs the openings when in the closed position;
    each of the one panel and the door being dimensioned relative to one another so that said door simultaneously engages and clamps the lugged cables against said one panel when the lugged cables are passed through the respective openings and the door is in the closed position.

10. The portable power distribution cabinet of claim 9 further comprising a plurality of cable guide channels mounted within the enclosure, each of the cable guide channels being arranged and configured to extend between one of the openings of the one panel and one of the power input and output conductors, so that lugged cables passed through the openings are received into a corresponding cable guide channel for guided movement to a respective one of the power input and output conductors.

11. The portable power distribution cabinet of claim 9, wherein the enclosure includes a rotatable cabinet door panel for access to the interior of the enclosure for coupling the lugged cables to the power input and output conductors.

12. The portable power distribution cabinet of claim 11, further comprising a transparent panel mounted beneath the rotatable cabinet door panel to isolate the interior of the enclosure when the rotatable cabinet door is rotated for access to the interior of the enclosure; the transparent panel being formed to include small diameter holes for insertion of a tool to engage the lugged cables for coupling to the power input and output conductors.

* * * * *